United States Patent
Yamashita et al.

(10) Patent No.: US 6,900,273 B1
(45) Date of Patent: May 31, 2005

(54) LOW-HYGROSCOPICITY LOW-BIREFRINGENCE RESIN COMPOSITIONS, MOLDING MATERIAL OBTAINED THEREFROM, SHEET OR FILM, AND OPTICAL PART

(75) Inventors: Yukihiko Yamashita, Ichihara (JP); Shuichi Iwata, Ichihara (JP); Tetsuo Yamanaka, Ichihara (JP); Akihiro Yoshida, Ichihara (JP); Keiko Ushikubo, Mobara (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/019,753

(22) PCT Filed: Jun. 27, 2000

(86) PCT No.: PCT/JP00/04215

§ 371 (c)(1),
(2), (4) Date: Mar. 5, 2002

(87) PCT Pub. No.: WO01/00728

PCT Pub. Date: Jan. 4, 2001

(30) Foreign Application Priority Data

| Jun. 28, 1999 | (JP) | ............................................ 11/181181 |
| Jun. 28, 1999 | (JP) | ............................................ 11/181182 |
| Jan. 28, 2000 | (JP) | ........................................ 2000/024774 |
| Jan. 28, 2000 | (JP) | ........................................ 2000/024775 |
| Jan. 28, 2000 | (JP) | ........................................ 2000/024776 |

(51) Int. Cl.$^7$ ............................................. C08L 45/00
(52) U.S. Cl. ........................ 525/210; 525/241; 525/479; 525/474; 525/75
(58) Field of Search ................................ 525/241, 240, 525/211, 75; 524/267, 323, 351

(56) References Cited

U.S. PATENT DOCUMENTS

| 3,888,941 | A | * | 6/1975 | Weaver ........................ 525/74 |
| 4,066,717 | A | * | 1/1978 | Li et al. ...................... 260/874 |
| 4,082,820 | A | * | 4/1978 | Li et al. ...................... 260/879 |
| 4,100,226 | A | * | 7/1978 | Li ............................... 260/879 |
| 4,105,713 | A | * | 8/1978 | Sigwalt et al. .............. 260/879 |
| 4,195,135 | A | * | 3/1980 | Li et al. ........................ 525/69 |
| 4,267,086 | A | * | 5/1981 | Pett et al. .............. 260/28.5 R |
| 4,326,045 | A | * | 4/1982 | Li et al. ...................... 525/206 |
| 4,432,607 | A | * | 2/1984 | Levy ........................ 350/96.34 |
| 4,492,428 | A |   | 1/1985 | Levy .......................... 350/96.3 |
| 4,603,186 | A | * | 7/1986 | Wu et al. .................... 526/280 |
| 5,124,240 | A | * | 6/1992 | Brosius et al. .............. 430/495 |
| 5,229,449 | A | * | 7/1993 | Enomoto et al. ........... 524/446 |
| 5,753,775 | A | * | 5/1998 | Beckmann et al. ....... 525/327.9 |
| 6,228,944 | B1 | * | 5/2001 | Blok et al. ................... 525/210 |
| 6,265,478 | B1 | * | 7/2001 | Kralevich et al. .......... 524/518 |

FOREIGN PATENT DOCUMENTS

| EP | 0 393 685 A1 |   | 10/1990 | |
| JP | 4-323246 A | * | 11/1992 | ........... C08L/45/00 |
| JP | 10231403 A |   | 9/1998 | |
| JP | 10-231403 A | * | 9/1998 | ........... C08L/25/04 |
| JP | 11246733 A |   | 9/1999 | |
| JP | 11-246733 A | * | 9/1999 | ........... C08L/53/00 |
| JP | 2002-3706 A | * | 1/2002 | ........... C08L/65/00 |

* cited by examiner

*Primary Examiner*—David W. Wu
*Assistant Examiner*—Rip A Lee
(74) *Attorney, Agent, or Firm*—Knobbe, Martens, Olson & Bear LLP

(57) ABSTRACT

Low-hygroscopicity low-birefringence resin compositions. One of the compositions is a resin composition (a) comprising the following polymers (A), and (B) and/or (C). Another is a resin composition (b) comprising the following polymers (A), (B) and (H). Still another is a polymer comprising the following polymers (I) and (J), diphenylsilicone (D), and a phenolic antioxidant (E). (A) A polymer comprising one or more kinds of indene and indene derivatives represented by the following general formula (I). (B) A polymer comprising polystyrene or a polystyrene derivative. (C) A polymer comprising a monomer copolymerizable with styrene or a styrene derivative. (H) A graft polymer having a structure wherein a polymer comprising at least one kind of indene and an indene derivative represented by the general formula (I) bonds to a side chain of a polymer comprising a monomer copolymerizable with styrene or a styrene derivative. (I) A polymer comprising one or more kinds of indene and indene derivatives represented by the general formula (I), wherein the polymer has a heterocyclic structure in a side chain thereof. (J) A polymer comprising styrene or a styrene derivative, and a monomer copolymerizable with styrene or a styrene derivative, wherein the polymer has a carboxyl group and/or a phenolic hydroxyl group in a side chain thereof.

21 Claims, No Drawings

LOW-HYGROSCOPICITY LOW-BIREFRINGENCE RESIN COMPOSITIONS, MOLDING MATERIAL OBTAINED THEREFROM, SHEET OR FILM, AND OPTICAL PART

This is the U.S. National Phase under 35 U.S.C. § 371 of International Application PCT/JP00/04215, filed Jun. 27, 2000, which was published in a language other than English, which claims priority of Japanese Patent Application No. 11-181181, filed Jun. 28, 1999; Japanese Patent Application No. 11-181182, filed Jun. 28, 1999; Japanese Patent Application No. 2000-24774, filed Jan. 28, 2000; Japanese Patent Application No. 2000-24775, filed Jan. 28, 2000; and Japanese Patent Application No. 2000-24776, filed Jan. 28, 2000.

TECHNICAL FIELD

The present invention relates to resin compositions having low hygroscopicity, low birefringence and low permittivity, being excellent in fluidity, causing little change in color in heating, and being excellent in mold release characteristics in injection molding, and to a molding material, a sheet, or a film obtained by molding these resin compositions and to an optical part.

BACKGROUND ART

Many of the monomers having an unsaturated bond with reaction activity can yield a polymer by selecting a catalyst that can cause cleavage of the unsaturated bond to initiate a chain reaction and appropriate reaction conditions. In general, there are an extremely wide variety of kinds of the monomers having an unsaturated bond, so that kinds of the resins that can be obtained therefrom also come in a great many varieties. However, there are relatively few kinds of monomers that can yield a product having a high molecular weight of 10,000 or higher, which is generally called as a high molecular compound. For example, typical monomers include ethylene, substituted ethylenes, propylene, substituted propylenes, styrene, alkylstyrenes, alkoxystyrenes, norbornene, various acrylic esters, butadiene, cyclopentadiene, dicyclopentadiene, isoprene, maleic anhydride, maleimide, fumarate esters, allyl compounds, and the like. Various kinds of resins are synthesized from these monomers or various combinations thereof.

The use of these resins is mainly limited to the field of relatively inexpensive commercial equipment, and there is little application to the field of high technology such as semiconductor-related materials and the like. This is because heat resistance, low hygroscopicity and permittivity have not been simultaneously achieved.

For instance, in the field of semiconductor-related materials, on account of increased density in integration in recent years, it has been desired to further attain low permittivity in addition to heat resistance and low hygroscopicity that have already been achieved. In order to achieve low permittivity, it is indispensable in principle to decrease the number of polar groups in a resin. At present, polyimides are often employed as resins for semiconductors. However, a lot of hard work has been made to achieve low permittivity because polyimides contain many carbonyl groups in a resin skeleton. As measures to overcome the situation, researches using the monomers containing fluorine have been done extensively, but sufficiently low permittivity has not been achieved. Moreover, there are some problems such as the rising price of resins, complicated synthesis of resins, and the like.

As another method, attempts to synthesize a polymer comprising a hydrocarbon containing no polar groups have been made. An example of such a polymer is a series of polymers called cyclic polyolefins. Specific examples include a polymer obtained by hydrogenating polynorbornene, or a polymer comprising polydicyclopentene and a derivative thereof. Although these polymers can exhibit extremely low permittivity, they have problems such as low heat resistance and very high permeability of water in spite of extremely low water absorption. In particular, the high permeability of water is a common characteristic of polyolefins, and it is considered to be extremely difficult to solve this problem.

Another example is a syndiotactic polystyrene synthesized by using Ziegler-Natta catalyst or Kaminsky catalysts. This polymer has a structure that three-dimensional positions of the benzene rings to the backbone are located alternately in the opposite directions, so that it is possible to attain very high heat resistance and at the same time extremely low water absorption, extremely low permeability of water and very low level of permittivity. However, this polymer has such high crystallinity that it has a problem of considerably poor adhesion to a base material and also has another problem that methods of processing it are markedly limited because it is insoluble in any solvents. That is, at present, a polymer that can overcome the above-mentioned problems has not been developed yet.

On the other hand, typical polymers for optical uses, such as optical lenses, optical waveguide materials and the like include acrylic resins and polyolefin resins. Acrylic resins have characteristics of having excellent transparency and workability and extremely low birefringence. However, they have disadvantages that they have high hygroscopicity, relatively low heat resistance and low toughness. By contrast, polyolefin resins have excellent heat resistance and extremely low hygroscopicity, but they are inferior to acrylic resins in transparency and low birefringence. That is, both of acrylic resins and polyolefin resins have both advantages and disadvantages, and thus it has strongly been desired to develop a resin compensating for the disadvantages of acrylic resins and polyolefin resins.

Thus, in order to improve acrylic resins, that is, to overcome the disadvantages such as high hygroscopicity and low heat resistance, a lot of investigations have been carried out. For example, there is a method of improving hygroscopicity and heat resistance by using a monomer having a bulky substituent (disclosed in Japanese Patent No. 2678029). Although this invention is indeed effective to a certain extent, the improved acrylic resin is still interior to polyolefin resins in hygroscopicity. This invention poses still another problem that there is a drastic reduction in toughness and strength because a bulky substituent is present in a side chain, so that the resin becomes likely to be broken particularly in molding processing. Although there is a method of attempting to give toughness to the resin by copolymerizing a monomer that gives flexibility for the purpose of improving this, decrease in heat resistance is inevitable, and thus the effect of introducing a bulky substituent is weakened.

Polyolefin resins have extremely great advantages of low hygroscopicity and high heat resistance as resins of optical use, but the high birefringence thereof has become a great disadvantage with the increasing sophistication of optical devices in recent years. Therefore, many attempts to lower the birefringence of polyolefin resins have been made particularly recently.

Such an example is disclosed in Japanese Patent Application Laid-open No. Hei 8-110402. This invention is that a resin or a low molecular weight compound having birefringence with the opposite sign to the birefringence of a polyolefin resin is mixed to the polyolefin resin to compensate the birefringence intrinsic to the resin, thereby reducing the birefringence of the resin mixture to zero. In this method, it is required that a resin to be mixed and a polyolefin resin be completely compatible. However, compatibility of a polyolefin resin and a resin that is claimed is insufficient in the above invention, so that satisfactory effect cannot be achieved.

Thus, in order to realize as complete compatibility as possible, a method of adding a compatibility agent as the third component is carried out as a polymer alloying technique, and it is specifically described in U.S. Pat. No. 4,373,065. In order to mix both of the above highly homogeneously, both should be in a molten state or a solution state. However, it is considered that it is extremely difficult to obtain a practical polymer material that is highly homogeneous and has no birefringence as a whole by using any physical method.

A method to solve these problems is disclosed in Japanese Patent Application No. Hei 8-199901. This method has some problems such as remaining a portion of a resin in a die when removing a product from the die in injection molding of the resin composition or breaking a product in mold releasing. Moreover, it has a disadvantage in that the color of a product changes while the resin stays in a molding machine for a long time.

DISCLOSURE OF THE INVENTION

The present invention provides resin compositions having low hygroscopicity, low birefringence and low permittivity, excelling in fluidity, causing little change in color upon heating, and being excellent in mold release characteristics in injection molding, a molding material, a sheet or a film obtained by molding these resin compositions, and an optical part.

The present invention relates to the following items (1) to (22).
(1) A resin composition (a) comprising the following polymers (A), and (B) and/or C):
(A) a polymer comprising one or more kinds of indene and indene derivatives represented by the following general formula (I);
(B) a polymer comprising polystyrene or a polystyrene derivative; and
(C) a polymer comprising a monomer copolymerizable with styrene or a styrene derivative:

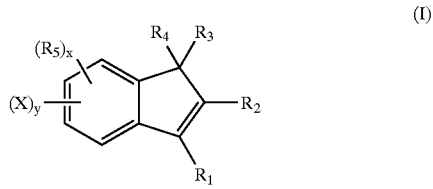

(wherein $R_1$, $R_2$, $R_3$, $R_4$, and $R_5$ may be the same or different, and each represents a hydrogen atom; a monovalent hydrocarbon group containing a nitrogen atom, an oxygen atom or a silicon atom; an alkyl group having 1 to 6 carbon atoms; or a monovalent aromatic hydrocarbon group. X represents a hydrogen atom, a halogen atom, an acyl group, an alkoxy group or a nitrile group. x represents 0 or an integer of 1 to 3, and y represents an integer of 1 to 4, where x+y=4.).

(2) The resin composition (a) according to (1), wherein a diphenylsilicone (D) and/or a phenolic antioxidant (E) are/is added to the resin composition comprising the polymers (A), and (B) and/or (C).
(3) The resin composition (a) according to (1) or (2), wherein the saturated water absorption is 0.4% or less, and the birefringence in stretching the resin composition by 200% is in the range of $-2 \times 10^{-6}$ to $2 \times 10^{-6}$.
(4) The resin composition (a) according to any one of (1) to (3), wherein the weight-average molecular weight of the polymer (A) is lower than 80000.
(5) The resin composition (a) according to any one of (1) to (4), wherein the weight-average molecular weight(s) of the polymer (B) and/or the polymer (C) are/is 50000 or higher.
(6) The resin composition (a) according to any one of (1) to (5), wherein the content of the polymer (A) is 30 to 90% by weight of the total of the resin composition (a).
(7) A resin composition (b) comprising the following polymers (F), (G) and (H):
(F) a polymer comprising one or more kinds of indene and indene derivatives represented by the above general formula (I);
(G) a polymer comprising polystyrene or a polystyrene derivative; and
(H) a graft polymer having a structure where a polymer comprising at least one kind of indene and indene derivatives represented by the general formula (I) bonds to a side chain of a polymer comprising a monomer copolymerizable with styrene or a styrene derivative.
(8) The resin composition (b) according to (7), wherein a diphenylsilicone (D) and/or a phenolic antioxidant (E) are/is added to the resin composition comprising the polymers (F), (G) and (H).
(9) The resin composition (b) according to (7) or (8), wherein the saturated water absorption is 0.4% or less, and the birefringence in stretching the resin composition by 200% is in the range of $-2 \times 10^{-6}$ to $2 \times 10^{-6}$.
(10) The resin composition (b) according to any one of (7) to (9), wherein the weight-average molecular weight of the polymer (F) is 4000 or higher.
(11) The resin composition (b) according to any one of (7) to (10), wherein the weight-average molecular weights of the polymer (G) and the polymer (H) are 50000 or higher.
(12) The resin composition (b) according to any one of (7) to (11), wherein the content of the polymer (F) is 30 to 90% by weight of the total of the resin composition (b).
(13) A resin composition (c) comprising the following polymers (I) and (J), diphenylsilicone (D), and a phenolic antioxidant (E):
(I) a polymer comprising one or more kinds of indene and indene derivatives represented by the above general formula (I), wherein the polymer has a heterocyclic structure in a side chain thereof; and
(J) a polymer comprising styrene or a styrene derivative, and a monomer copolymerizable with styrene or a styrene derivative, wherein the polymer has a carboxyl group and/or a phenolic hydroxyl group in a side chain thereof.
(14) The resin composition (c) according to (13), wherein the saturated water absorption is 0.4% or less, and the birefringence in stretching the resin composition by 200% is in the range of $-2 \times 10^{-6}$ to $2 \times 10^{-6}$.
(15) The resin composition (c) according to (13) or (14), wherein the content of the heterocyclic structure in the polymer (I) is 0.01 to 5 mol % of the total of the resin composition (c), and the content of the carboxyl group and/or the phenolic hydroxyl group in the polymer (J) is 0.01 to 5 mol % of the total of the resin composition (c).

(16) The resin composition (c) according to any one of (13) to (15), wherein the molar ratio of the heterocyclic structure to the carboxyl group and/or the phenolic hydroxyl group is 0.1 to 10.0.
(17) The resin composition (c) according to any one of (13) to (16), wherein the content of the polymer (I) is 30 to 90% by weight of the total of the resin composition (c).
(18) The resin composition (c) according to any one of (13) to (17), wherein the addition amount of the diphenylsilicone (D) is 0.01 to 1.0% by weight of the total of the resin composition (c), and the addition amount of the phenolic antioxidant (E) is 0.1 to 3.0% by weight of the total of the resin composition (c).
(19) A molding material obtained by molding a resin composition selected from the resin composition (a) according to (1), the resin composition (b) according to (7) and the resin composition (c) according to (13).
(20). A sheet obtained from a resin composition selected from the resin composition (a) according to (1), the resin composition (b) according to (7) and the resin composition (c) according to (13).
(21) A film obtained from a resin composition selected from the resin composition (a) according to (1), the resin composition (b) according to (7) and the resin composition (c) according to (13).
(22) An optical part using the molding material, the sheet or the film according to any one of (19) to (21).

Hereinbelow, the present invention will be described in detail.

<1> The Resin Composition (a) of the Present Invention

A resin composition (a) of the present invention is a resin composition comprising the following polymers (A), and (B) and/or (C):
(A) a polymer comprising one or more kinds of indene and indene derivatives represented by the general formula (I) described above;
(B) a polymer comprising polystyrene or a polystyrene derivative; and
(C) a polymer comprising a monomer copolymerizable with styrene or a styrene derivative.

In the resin composition (a) of the present invention, the above polymer (A) is not particularly limited and any polymer may be employed as the polymer (A), as long as it may be any polymer containing one or more kinds of indene and indene derivatives represented by the above general formula (I).

The indene derivatives for use in the above polymer (A) include those represented by the above general formula (I), wherein $R_1$, $R_2$, $R_3$, $R_4$, and $R_5$, may be the same or different, and each represents a hydrogen atom; a monovalent hydrocarbon group containing a nitrogen atom, an oxygen atom or a silicon atom; an alkyl group having 1 to 6 carbon atoms; or a monovalent aromatic hydrocarbon group.

Monovalent hydrocarbon groups containing a nitrogen atom, an oxygen atom or a silicon atom include, for example, dimethylaminoethyl group, diethylaminoethyl group, methoxy group, ethoxy group, propoxy group, butoxy group, pentoxy group, hexoxy group, trimethylsilyl group, triethylsilyl group, and the like.

Alkyl groups having 1 to 6 carbon atoms include, for example, methyl group, ethyl group, propyl group, n-butyl group, isobutyl group, t-butyl group, n-pentyl group, 2-methylbutyl group, 3-methylbutyl group, t-pentyl group, n-hexyl group, 2-methylpentyl group, 3-methylpentyl group, 4-methylpentyl group, 1-methylpentyl group, 2,2-dimethylbutyl group, 2,3-dimethylbutyl group, 2,4-dimethylbutyl group, 3,3-dimethylbutyl group, 3,4-dimethylbutyl group, 4,4-dimethylbutyl group, 2-ethylbutyl group, 1-ethylbutyl group, cyclohexyl group, and the like.

Monovalent aromatic hydrocarbon groups include phenyl group, naphthyl group, benzyl group, and the like. Those listed hereinbefore are simply examples, and monovolent aromatic hydrocarbon groups are not limited thereto.

X represents a hydrogen atom, a halogen atom, an acyl group, an alkoxy group or a nitrile group. Halogen atoms in X include fluorine, chlorine, bromine, and iodine.

Acyl groups in X include formyl group, acetyl group, propionyl group, butyryl group, isobutyryl group, and the like.

Alkoxy groups in X include methoxy group, ethoxy group, propoxy group, butoxy group, pentoxy group, hexoxy group, and the like.

Furthermore, x represents 0 or an integer of 1 to 3, and y represents an integer of 1 to 4, where x+y=4.

The above indene or indene derivatives may be used singly or in combination with two or more as a monomer for use in the polymer (A).

The above indene derivatives having a substituent include nucleus-substituted alkylindenes such as nucleus-substituted methylindene, nucleus-substituted ethylindene, nucleus-substituted propylindene, nucleus-substituted butylindene and the like, nucleus-substituted chloroindene, nucleus-substituted bromoindene, and the like. More specifically, they preferably include methylindene, α-methylindene, β-methylindene, and the like.

The polymer (B) for use in the resin composition (a) is a polymer comprising polystyrene or a polystyrene derivative.

In the present invention, monomers for use in the production of the polymer (B) comprising polystyrene or a polystyrene derivative include, for example, styrene, nucleus-substituted alkylstyrenes, nucleus-substituted aromatic styrenes, α-substituted alkylstyrenes, β-substituted alkylstyrenes, nucleus-substituted alkoxystyrenes, and the like.

Nucleus-substituted alkylstyrenes that may be employed include, for example, o-methylstyrene, m-methylstyrene, p-methylstyrene, o-ethylstyrene, m-ethylstyrene, p-ethylstyrene, o-propylstyrene, m-propylstyrene, p-propylstyrene, o-n-butylstyrene, m-n-butylstyrene, p-n-butylstyrene, o-isobutylstyrene, m-isobutylstyrene, p-isobutylstyrene, o-t-butylstyrene, m-t-butylstyrene, p-t-butylstyrene, o-n-pentylstyrene, m-n-pentylstyrene, p-n-pentylstyrene, o-2-methylbutylstyrene, m-2-methylbutylstyrene, p-2-methylbutylstyrene, o-3-methylbutylstyrene, m-3-methylbutylstyrene, p-3-methylbutylstyrene, o-t-pentylstyrene, m-t-pentylstyrene, p-t-pentylstyrene, o-n-hexylstyrene, m-n-hexylstyrene, p-n-hexylstyrene, o-2-methylpentylstyrene, m-2-methylpentylstyrene, p-2-methylpentylstyrene, o-3-methylpentylstyrene, m-3-methylpentylstyrene, p-3-methylpentylstyrene, o-1-methylpentylstyrene, m-1-methylpentylstyrene, p-1-methylpentylstyrene, o-2,2-dimethylbutylstyrene, m-2,2-dimethylbutylstyrene, p-2,2-dimethylbutylstyrene, o-2,3-dimethylbutylstyrene, m-2,3-dimethylbutylstyrene, p-2,3-dimethylbutylstyrene, o-2,4-dimethylbutylstyrene, m-2,4-dimethylbutylstyrene, p-2,4-dimethylbutylstyrene, o-3,3-dimethylbutylstyrene, m-3,3-dimethylbutylstyrene, p-3,3-dimethylbutylstyrene, o-3,4-dimethylbutylstyrene, m-3,4-dimethylbutylstyrene, p-3,4-dimethylbutylstyrene, o-4,4-dimethylbutylstyrene, m-4,4-dimethylbutylstyrene, p-4,4-dimethylbutylstyrene, o-2-ethylbutylstyrene, m-2-ethylbutylstyrene, p-2-ethylbutylstyrene, o-1-ethylbutylstyrene, m-1-ethylbutylstyrene, p-1-ethylbutylstyrene, o-cyclohexylstyrene, m-cyclohexylstyrene, p-cyclohexylstyrene, and the like. Those listed hereinbefore are simply examples, and nucleus-substituted alkylstyrenes are not limited thereto. These may be used singly or in combination with two or more.

Nucleus-substituted aromatic styrenes that may be employed include, for example, o-phenylstyrene, m-phenylstyrene, p-phenylstyrene, and the like. Those listed hereinbefore are simply examples, and nucleus-substituted aromatic styrenes are not limited thereto.

α-substituted alkylstyrenes that may be employed include, for example, α-methylstyrene, α-ethylstyrene, α-propylstyrene, α-n-butylstyrene, α-isobutylstyrene, α-t-butylstyrene, α-n-pentylstyrene, α-2-methylbutylstyrene, α-3-methylbutylstyrene, α-t-pentylstyrene, α-n-hexylstyrene, α-2-methylpentylstyrene, α-3-methylpentylstyrene, α-1-methylpentylstyrene, α-2,2-dimethylbutylstyrene, α-2,3-dimethylbutylstyrene, α-2,4-demethylbutylstyrene, α-3,3-dimethylbutylstyrene, α-3,4-dimethylbutylstyrene, α-4,4-dimethylbutylstyrene, α-2-ethylbutylstyrene, α-1-ethylbutylstyrene, α-cyclohexylstyrene, and the like. Those listed hereinbefore are simply examples and α-substituted alkylstyrenes are not limited thereto. These may be used singly or in combination with two or more.

β-substituted alkylstyrenes that may be employed include, for example, β-methylstyrene, β-ethylstyrene, β-propylstyrene, β-n-butylstyrene, β-isobutylstyrene, β-t-butylstyrene, β-n-pentylstyrene, β-2-methylbutylstyrene, β-3-methylbutylstyrene, β-t-pentylstyrene, β-n-hexylstyrene, β-2-methylpentylstyrene, β-3-methylpentylstyrene, β-1-methylpentylstyrene, β-2,2-dimethylbutylstyrene, β-2,3-dimethylbutylstyrene, β-2,4-dimethylbutylstyrene, β-3,3-dimethylbutylstyrene, β-3,4-dimethylbutylstyrene, β-4,4-dimethylbutylstyrene, β-2-ethylbutylstyrene, β-1-ethylbutylstyrene, β-cyclohexylstyrene, and the like. Those listed hereinbefore are simply examples, and β-substituted alkylstyrenes are not limited thereto. These may be used singly or in combination with two or more.

Nucleus-substituted alkoxystyrenes that may be employed include, for example, o-methoxystyrene, m-methoxystyrene, p-methoxystyrene, o-ethoxystyrene, m-ethoxystyrene, p-ethoxystyrene, o-propoxystyrene, m-propoxystyrene, p-propoxystyrene, o-n-butoxystyrene, m-n-butoxystyrene, p-n-butoxystyrene, o-isobutoxystyrene, m-isobutoxystyrene, p-isobutoxystyrene, o-t-butoxystyrene, m-t-butoxystyrene, p-t-butoxystyrene, o-n-pentoxystyrene, m-n-pentoxystyrene, p-n-pentoxystyrene, o-2-methylbutoxystyrene, m-2-methylbutoxystyrene, p-2-methylbutoxystyrene, o-3-methylbutoxystyrene, m-3-methylbutoxystyrene, p-3-methylbutoxystyrene, o-t-pentoxystyrene, m-t-pentoxystyrene, p-t-pentoxystyrene, o-n-hexoxystyrene, m-n-hexoxystyrene, p-n-hexoxystyrene, o-2-methylpentoxystyrene, m-2-methylpentoxystyrene, p-2-methylpentoxystyrene, o-3-methylpentoxystyrene, m-3-methylpentoxystyrene, p-3-methylpentoxystyrene, o-1-methylpentoxystyrene, m-1-methylpentoxystyrene, p-1-methylpentoxystyrene, o-2,2-dimethylbutoxystyrene, m-2,2-dimethylbutoxystyrene, p-2,2-dimethylbutoxystyrene, o-2,3-dimethylbutoxystyrene, m-2,3-dimethylbutoxystyrene, p-2,3-dimethylbutoxystyrene, o-2,4-dimethylbutoxystyrene, m-2,4-dimethylbutoxystyrene, p-2,4-dimethylbutoxystyrene, o-3,3-dimethylbutoxystyrene, m-3,3-dimethylbutoxystyrene, p-3,3-dimethylbutoxystyrene, o-3,4-dimethylbutoxystyrene, m-3,4-dimethylbutoxystyrene, p-3,4-dimethylbutoxystyrene, o-4,4-dimethylbutoxystyrene, m-4,4-dimethylbutoxystyrene, p-4,4-dimethylbutoxystyrene, o-2-ethylbutoxystyrene, m-2-ethylbutoxystyrene, p-2-ethylbutoxystyrene, o-1-ethylbutoxystyrene, m-1-ethylbutoxystyrene, p-1-ethylbutoxystyrene, o-cyclohexoxystyrene, m-cyclohexoxystyrene, p-cyclohexoxystyrene, o-phenoxystyrene, m-phenoxystyrene, p-phenoxystyrene, and the like. Those listed hereinbefore are simply examples, and nucleus-substituted alkoxystyrenes are not limited thereto. These may be used singly or in combination with two or more.

The polymer (C) for use in the resin composition (a) is a polymer comprising a monomer copolymerizable with styrene or a styrene derivative. Monomers copolymerizable with styrene or a styrene derivative for use in the polymer (C) include, for example, styrene, nucleus-substituted alkylstyrenes, nucleus-substituted aromatic styrenes, α-substituted alkylstyrenes, β-substituted alkylstyrenes, nucleus-substituted alkoxystyrenes, alkyl vinyl ethers, aromatic vinyl ethers, isobutene, diisobutylene, (meth)acrylic esters having 1 to 8 carbon atoms, and the like. These may be used singly or in combination with two or more.

Nucleus-substituted alkylstyrenes, nucleus-substituted aromatic styrenes, α-substituted alkylstyrenes, β-substituted alkylstyrenes, and nucleus-substituted alkoxystyrenes include the same as listed for the monomers for use in the polymer (B).

Alkyl groups in alkyl vinyl ethers are not particularly limited, and any alkyl group may be employed. Alkyl vinyl ethers include, for example, those having alkyl groups such as methyl, ethyl, propyl, n-butyl, isobutyl, t-butyl, n-pentyl, 2-methylbutyl, 3-methylbutyl, t-pentyl, n-hexyl, 2-methylpentyl, 3-methylpentyl, 4-methylpentyl, 1-methylpentyl, 2,2-dimethylbutyl, 2,3-dimethylbutyl, 2,4-dimethylbutyl, 3,3-dimethylbutyl, 3,4-dimethylbutyl, 4,4-dimethylbutyl, 2-ethylbutyl, 1-ethylbutyl, cyclohexyl, and the like. Those listed hereinbefore are simply examples, and alkyl vinyl ethers are not limited thereto. These may be used singly or in combination with two or more.

Aromatic vinyl ethers include, for example, phenyl vinyl ether and the like. Those listed hereinbefore are simply examples, and aromatic vinyl ethers are not limited thereto.

(Meth)acrylic esters having 1 to 8 carbon atoms include methyl (meth)acrylate, ethyl (meth)acrylate, propyl (meth) acrylate, n-butyl (meth)acrylate, i-butyl (meth)acrylate, n-pentyl (meth)acrylate, n-hexyl (meth)acrylate, n-heptyl (meth)acrylate, n-octyl (meth)acrylate, 2-ethylhexyl (meth) acrylate, and the like. Those listed hereinbefore are simply examples, and (meth)acrylic esters having 1 to 8 carbon atoms are not limited thereto. These may be used singly or in combination with two or more.

The above styrene, nucleus-substituted alkylstyrenes, α-substituted alkylstyrenes, β-substituted alkylstyrenes, nucleus-substituted alkoxystyrenes, alkyl vinyl ethers, aromatic vinyl ethers, isobutene, diisobutylene, (meth)acrylic esters having 1 to 8 carbon atoms, and the like for use in the polymer (C) may have a substituent such as an alkyl group, a phenyl group, a halogen atom and the like at an optional position.

Methods of the production of the above polymers (A), (B) and (C) in the resin composition (a) of the present invention are not particularly limited, and the polymers can be produced by a conventional method. For example, they can be produced by cationic polymerization, anionic polymerization, radical polymerization, living radical polymerization, or the like. The above polymerization methods can be selected depending on a catalyst employed.

Catalysts for use in cationic polymerization are not particularly limited, and publicly known catalysts may be employed. Such catalysts that may be employed include, for example, Lewis acids such as aluminium chloride, iron chloride, tin chloride, zinc chloride, strontium chloride, scandium chloride and the like, proton acids such as sulfuric acid, para-toluenesulfonic acid, hydrochloric acid, nitric acid and the like, alkylaluminium chlorides, and the like. Those listed hereinbefore are simply examples, and the catalysts are not limited thereto. These may be used singly or in combination with two or more.

Catalysts for use in anionic polymerization are not particularly limited, and publicly known catalysts may be employed. Such catalysts that may be employed include, for example, butyllithium and the like. Those listed hereinbefore are simply examples, and the catalysts are not limited thereto.

Catalysts for use in radical polymerization are not particularly limited, and publicly known catalysts may be employed. Such catalysts include, for example, peroxides such as benzoyl peroxide, lauryl peroxide, methyl ethyl ketone peroxide and the like. Those listed hereinbefore are simply examples, and the catalysts are not limited thereto. These may be used singly or in combination with two or more.

Catalysts for use in radical polymerization are not particularly limited, and publicly known catalysts may be employed. Such catalysts include, for example, peroxides such as benzoyl peroxide, lauroyl peroxide, methyl ethyl ketone peroxide and the like. Those listed hereinbefore are simply examples, and the catalysts are not limited thereto. These may be used singly or in combination with two or more.

With respect to polymerization methods, the polymers can be synthesized by solution polymerization, suspension polymerization, bulk polymerization, or the like. In particular, the solution polymerization method is the most preferable.

Solvents employed are not particularly limited, and publicly known solvents may be employed. Typical solvents include, for example, chloromethane, dichloromethane, trichloromethane, tetrachloromethane, chloroethane, dichloroethane, trichloroethane, tetrachloroethane, chloroethylene, dichloroethylene, nitrobenzene, dinitrobenzene, trinitrobenzene, alkylbenzenes such as methylbenzene, dimethylbenzene, trimethylbenzene, ethylbenzene, diethylbenzene, triethylbenzene and the like, ketones such as acetone, methyl ethyl ketone, methyl isobutyl ketone and the like, and esters such as MMA, ethyl acetate, butyl acetate and the like. Those listed hereinbefore are simply examples, and the solvents are not limited thereto. These say be used singly or in combination with two or more.

The polymerization temperature is preferably in the range of −100 to 180° C. If the polymerization reaction is carried out at a lower temperature than −100° C., decrease in reactivity is caused, so that it is difficult to obtain a sufficiently high molecular weight compound. The temperatures exceeding 180° C. lead to too high reactivity of the propagation terminal, so that it sometimes becomes to be difficult to obtain a high molecular weight compound because a vast number of chain transfer reactions occur.

In the resin composition (a), the weight-average molecular weight of the polymer (A) is preferably lower than 80000, more preferably lower than 40000. If the weight-average molecular weight of the polymer (A) is higher than 80000, fluidity and transparency of the resin composition (a) tend to decrease.

To make the weight-average molecular weight of the polymer (A) within the above range, the molecular weight can be adjusted by selecting the kind or amount of the catalyst used in polymerization, using a polymerization inhibitor, using a chain transfer agent, controlling the polymerization temperature or the like.

Furthermore, the weight-average molecular weight(s) of the polymer (B) and/or the polymer (C) are/is preferably 50000 or higher, more preferably 100000 or higher. If the weight-average molecular weight(s) of the polymer (B) and/or the polymer (C) are/is lower than 50000, strength of a molding material tends to decrease.

To make the weight-average molecular weight(s) of the polymer (B) and/or the polymer (C) within the above range, the molecular weight(s) can be adjusted by selecting the kind or amount of the catalyst used in polymerization, using a polymerization inhibitor, using a chain transfer agent, controlling the polymerization temperature or the like.

Weight-average molecular weights can be determined by GPC measurement with a tetrahydrofuran solution.

The polymers (A), (B) and (C) obtained by the above method can be used for the resin composition (a) after isolating the polymers by a conventional method.

In the present invention, the content of the polymer (A) is preferably 30 to 90% by weight of the total of the resin composition (a), more preferably 50 to 90% by weight, still more preferably 60 to 85% by weight. If the content of the polymer (A) is less than 30% by weight or more than 90% by weight of the total of the resin composition (a), the absolute value of birefringence tends to increase.

Moreover, it is preferred to add a diphenylsilicone (D) and/or a phenolic antioxidant (E) to the resin composition (a).

Viscosity of the diphenylsilicone (D) for use in the resin composition (a) of the present invention is not particularly limited, and any diphenylsilicone (D) having any viscosity may be used. The addition amount of the diphenylsilicone (D) is preferably in the range of 0.01 to 1.0% by weight, more preferably 0.05 to 0.8% by weight of the total of the resin composition (a). If the addition amount is less than 0.01% by weight, the effect on mold release characteristics from a die in injection molding tends to decrease, while if the addition amount exceeds 1.0% by weight, heat resistance tends to decrease.

Phenolic antioxidants (E) for use in the present invention include, for example, dibutylhydroxytoluene, alkylated phenols, 4,4'-thiobis(6-t-butyl-3-methylphenol), 4,4'-butylidenebis(6-t-butyl-3-methylphenol), 2,2"-methylenebis (4-methyl-6-t-butylphenol), 2,2"-methylenebis(4-ethyl-6-t-butylphenol), 2,6-di-t-butyl-4-ethylphenol, 1,1,-tris(2-methyl-4-hydroxy-5-t-butylphenyl)butane, n-octadecyl-3-(4-hydroxy-3,5-t-dibutylphenyl)propionate, tetrakis (methylene-3-(3,5-di-t-butyl-4-hydroxyphenyl)prop ionate, dilaurylthiodipropionate, distearylthiodipropionate, dimyristylthiodipropionate, and the like, and the phenolic antioxidants are not limited thereto. These may be used singly or in combination with two or more. The addition amount of a phenolic antioxidant (E) is preferably in the range of 0.1 to 3.0% by weight, more preferably 0.5 to 2.0% by weight of the total of the resin composition (a). If the addition amount is less than 0.1% by weight, the effect to suppress changes in hue is a little, while if the addition amount exceeds 3.0% by weight, transparency and heat resistance of the resin tend to decrease.

Methods of mixing the polymers (A), and (B) and/or (C), a diphenylsilicone (D), and a phenolic antioxidant (E) are not particularly limited, and a resin composition can be produced by weighing out prescribed amounts of each polymer and a diphenylsilicone and a phenolic antioxidant, and melt-kneading these, or also can be produced by dissolving each polymer, a diphenylsilicone and a phenolic antioxidant in a solvent such as toluene, THF, NMP and the like, and then removing the solvent.

The resin composition (a) of the present invention obtained as mentioned above preferably has a saturated water absorption of 0.4% or less, and preferably has a birefringence in stretching the resin composition by 200% in the range of $-2 \times 10^{-6}$ to $2 \times 10^{-6}$. More preferable saturated water absorption is 0.2% or less, and more preferable birefringence in stretching the resin composition by 200% is in the range of $-1 \times 10^{-6}$ to $1 \times 10^{-6}$.

Saturated water absorptions exceeding 0.4% lead to an increased change in refraction index in absorbing water, thus it is not preferable. Moreover, if the birefringence in stretching the resin composition by 200% is out of the range of $-2 \times 10^{-6}$ to $2 \times 10^{-6}$, it is not preferable because linearly polarized light sometimes greatly changes to elliptically polarized light.

To make the saturated water absorption within the above range, it is satisfactory to make the content of the polymer (A) within the range of 30 to 90% by weight of the total of the resin composition (a).

To make the birefringence in stretching the resin composition by 200% within the above range, it is satisfactory to make the content of the polymer (A) within the range of 30 to 90% by weight of the total of the resin composition (a).

The saturated water absorption (%) in the present invention can be calculated by measuring the water absorption when the water absorption reaches saturation with a sample fragment soaked in hot water at 70° C. "When the water absorption reaches saturation" is the state in which there is no more change in the water absorption even if the sample fragment is allowed to be soaked in hot water at 70° C. for a longer time.

Furthermore, concerning birefringence, the birefringence in stretching an obtained molding material by 200% at a temperature 5° C. lower than the glass transition point of the material can be measured by using, for example, Ellipsometer AEP-100 Type (produced by Shimadzu Corporation). Measurement conditions are as follows: temperature: 25° C.; and wavelength of the laser light: 632.8 nm. Moreover, the glass transition point of a molding material can be measured as follows. The glass transition point can be measured by DSC. (differential scanning calorimetry). A measurement by DSC is carried out under a condition of a temperature-elevating rate of 10° C./min.

<2> The Resin Composition (B) of the Present Invention

A resin composition (b) of the present invention is a resin composition comprising the following polymers (F), (G) and (H):
(F) a polymer comprising one or more kinds of indene and indene derivatives represented by the above general formula (I);
(G) a polymer comprising polystyrene or a polystyrene derivative; and
(H) a graft polymer having a structure where a polymer comprising at least one kind of indene and an indene derivative represented by the general formula (I) bonds to a side chain of a polymer comprising a monomer copolymerizable with styrene or a styrene derivative.

The polymer (F) for use in the resin composition (b) can be produced in the same manner as the polymer (A) for use in the resin composition (a) by using the same indene monomers as in the polymer (A). The weight-average molecular weight of the polymer (F) is preferably 4000 or higher, more preferably 8000 or higher. If the weight-average molecular weight of the polymer (F) is lower than 4000, heat resistance tends to decrease.

To make the weight-average molecular weight of the polymer (F) within the above range, the molecular weight can be adjusted by selecting the kind or amount of the catalyst used in polymerization, using a polymerization inhibitor, using a chain transfer agent, controlling the polymerization temperature or the like.

Furthermore, the polymer (G) for use in the resin composition (b) can be produced in the same manner as the polymer (B) for use in the resin composition (a) by using the same styrene monomers as in the polymer (B).

The graft polymer (H) for use in the resin composition (b) has a structure where a polymer comprising one or more kinds of indene and indene derivatives represented by the general formula (I) bonds to a side chain of a polymer comprising a monomer copolymerizable with styrene or a styrene derivative. That is, the graft polymer (H) has a backbone unit of the polymer comprising a monomer copolymerizable with styrene or a styrene derivative and branch units of the polymer comprising one or more kinds of indene and indene derivatives represented by the general formula (I).

Monomers copolymerizable with styrene or a styrene derivative for use in a constitutional monomer of the backbone unit of the graft polymer (H) include, for example, styrene, nucleus-substituted alkylstyrenes, nucleus-substituted aromatic styrenes, α-substituted alkylstyrenes, β-substituted alkylstyrenes, nucleus-substituted alkoxystyrenes, alkyl vinyl ethers, aromatic vinyl ethers, isobutene, diisobutylene, (meth)acrylic esters having 1 to 8 carbon atoms, and the like.

Nucleus-substituted alkylstyrenes, nucleus-substituted aromatic styrenes, α-substituted alkylstyrenes, β-substituted alkylstyrenes, and nucleus-substituted alkoxystyrenes include the same as listed for the monomers for use in the polymer (B) of the resin composition (a). Furthermore, alkyl vinyl ethers, aromatic vinyl ethers, and (meth)acrylic esters having 1 to 8 carbon atoms include the same as listed for the monomers for use in the polymer (C) of the resin composition (a).

The above styrene, nucleus-substituted alkylstyrenes, α-substituted alkylstyrenes, β-substituted alkylstyrenes, nucleus-substituted alkoxystyrenes, alkyl vinyl ethers, aromatic vinyl ethers, isobutene, diisobutylene, (meth)acrylic esters having 1 to 8 carbon atoms, and the like for use in the graft polymer (H) may have a substituent such as an alkyl group, a benzene ring, a halogen atom at an optional position.

Indene or indene derivatives for use in a constitutional monomer of a branched unit of the graft polymer (H) include those represented by the general formula (I) as mentioned above.

In the resin composition (b) of the present invention, methods for the production of the above graft polymer (H) include conventional methods for the production of a graft polymer, and, for example, there is a method as follows.

The method comprises dissolving a polymer which was produced beforehand by radical polymerization of a monomer copolymerizable with styrene or a styrene derivative, etc., in toluene, THF, NMP or the like, further dissolving indene or an indene derivative represented by the general formula (I), thereafter adding a Lewis acid such as tin chloride, aluminum chloride and the like as a catalyst and 2,6-bis(t-butyl)pyridine and the like as an assist catalyst, and conducting cationic polymerization.

Furthermore, the weight-average molecular weight of the backbone unit of the graft polymer (H) is preferably 10000 or higher.

Furthermore, the weight-average molecular weights of the polymer (G) and the graft polymer (H) are preferably 50000 or higher, more preferably 100000 or higher. It the weight-average molecular weights of the polymer (G) and the graft polymer (H) are lower than 50000, strength of a molding material tends to decrease.

To make the weight-average molecular weights of the polymer (G) and the graft polymer (H) within the above range, the molecular weight can be adjusted by selecting the kind or amount of the catalyst used in polymerization, using a polymerization inhibitor, using a chain transfer agent, controlling the polymerization temperature or the like.

Moreover, it is preferred to add a diphenylsilicone and/or a phenolic antioxidant to the resin composition (b).

Similarly to the diphenylsilicone (D) for use in the resin composition (a), viscosity of the diphenylsilicone (D) for use in the resin composition (b) of the present invention is not particularly limited, and any diphenylsilicone (D) having any viscosity may be used. The addition amount of the diphenylsilicone (D) is preferably in the range of 0.01 to 1.01 by weight, more preferably 0.05 to 0.8 by weight of the total of the resin composition (b). If the addition amount is less than 0.01% by weight, the effect on mold release characteristics from a die in injection molding tends to decrease, while if the addition amount exceeds 1.0% by weight, heat resistance tends to decrease.

Phenolic antioxidants for use in the resin composition (b) of the present invention include phenolic antioxidants (E) for use in the resin composition (a). The addition amount of a phenolic antioxidant is not particularly limited, and is preferably in the range of 0.1 to 3.0% by weight, more preferably 0.5 to 2.0% by weight of the total of the resin composition (b). If the addition amount of a phenolic antioxidant (E) is less than 0.1% by weight, the effect to suppress changes in hue is a little, while if the addition amount exceeds 3.0% by weight, transparency and heat resistance of the resin tend to decrease.

Methods of mixing the polymers (F), (G) and (H) obtained by the above methods, a diphenylsilicone (D), and a phenolic antioxidant (E) are not particularly limited, and the same methods as in the above resin composition (a) may be used.

In the resin composition (b) of the present invention, the content of the polymer (F) is preferably 30 to 90% by weight of the total of the resin composition (b), more preferably 50 to 90% by weight, still more preferably 60 to 85% by weight. If the content of the polymer (F) is less than 30% by weight or more than 90% by weight of the total of the resin composition (b), the absolute value of birefringence tends to increase.

The resin composition (b) of the present invention obtained as mentioned above preferably has a saturated water absorption of 0.4% or less, and preferably has a birefringence in stretching the resin composition by 200% in the range of $-2\times10^{-6}$ to $2\times10^{-6}$. More preferable saturated water absorption is 0.2% or less, and more preferable birefringence in stretching the resin composition by 200% is in the range of $-1\times10^{-6}$ to $1\times10^{-6}$.

Saturated water absorptions exceeding 0.4% lead to an increased change in refraction index in absorbing water, thus it is not preferable. Moreover, if the birefringence in stretching the resin composition by 200% is out of the range of $-2\times10^{6}$ to $2\times10^{-6}$, it is not preferable because linearly polarized light sometimes greatly changes to elliptically polarized light.

To make the saturated water absorption within the above range, it is satisfactory to make the content of the polymer (F) within the range of 30 to 90% by weight of the total of the resin composition.

To make the birefringence in stretching the resin composition by 200% within the above range, it is satisfactory to make the content of the polymer (F) within the range of 30 to 90% by weight of the total of the resin composition.

<3> The Resin Composition (C) of the Present Invention

A resin composition (a) of the present invention is a resin composition comprising the following polymers (I) and (J), diphenylsilicone (D), and a phenolic antioxidant (E):

(I) a polymer comprising one or more kinds of indene and indene derivatives represented by the above general formula (I), wherein the polymer has a heterocyclic structure in a side chain thereof; and (J) a polymer comprising styrene or a styrene derivative, and a monomer copolymerizable with styrene or a styrene derivative, wherein the polymer has a carboxyl group and/or a phenolic hydroxyl group in a side chain thereof.

As indene monomers for use in the polymer (I), the same indene monomers as in the polymer (A) for use in the resin composition (a) may be used.

Methods for introducing a heterocyclic structure into a side chain of the polymer (I) are not particularly limited, and the following method is an example.

[1] After producing a polymer that comprises the above indene or an indene derivative and has functional groups, the polymer (I) having a heterocyclic structure in a side chain thereof is produced by reacting the above produced polymer with a compound having a heterocyclic structure.

Specifically, in the case of introducing a heterocyclic structure into a side chain of the polymer (I), for example, a copolymer having acid anhydride moieties as functional groups can be obtained by synthesizing a polymer of the above indene or an indene derivative and a vinyl monomer having an acid anhydride moiety, such as maleic anhydride. Then, a heterocyclic structure can be introduced into a side chain by ring-opening the acid anhydride moiety of maleic anhydride with an amino group of a compound having an amino group and a heterocyclic structure, such as aminopyridine.

[2] The polymer (I) having a heterocyclic structure in a side chain thereof is produced by copolymerizing a monomer having a heterocyclic structure with reaction activity with a monomer copolymerizable with indene or an indene derivative by a conventional method.

Monomers having a heterocyclic structure with reaction activity for use in the above [2] include, for example, pyridine, imidazoline, pyrazine, pyrimidine, quinoline, indolizine, acridine, furan, thiophene, oxazole and the like, each of which has a polymerizable reactive group. Specifically, vinylpyridine, pyridyl vinyl ether, pyridylmaleimide and the like may be used, and the monomers are not limited thereto. Furthermore, these may be used singly or in combination with two or more.

In the resin composition (c) of the present invention, the above polymer (J) comprises styrene or a styrene derivative, and a monomer copolymerizable with styrene or a styrene derivative, and it has a carboxyl group and/or a phenolic hydroxyl group in a side chain thereof.

Styrene derivatives for use in the polymer (J) include, for example, nucleus-substituted alkylstyrenes, nucleus-substituted aromatic styrenes, α-substituted alkylstyrenes, β-substituted alkylstyrenes, nucleus-substituted alkoxystyrenes, alkyl vinyl ethers, aromatic vinyl ethers, and the like, and specifically include the same monomers as the styrene monomers for use in the polymer (B) of the resin composition (a).

Furthermore, monomers copolymerizable with a styrene derivative for use in the polymer (J) include, for example, nucleus-substituted alkylstyrenes, nucleus-substituted aromatic styrenes, α-substituted alkylstyrenes, β-substituted alkylstyrenes, nucleus-substituted alkoxystyrenes, alkyl vinyl ethers, aromatic vinyl ethers, isobutene, diisobutylene, (meth)acrylic esters having 1 to 8 carbon atoms, and the like, and specifically include the same monomers as the monomers for use in the polymer (C) of the resin composition (c).

Methods for introducing a carboxyl group and/or a phenolic hydroxyl group into a side chain of the polymer (J) are not particularly limited, and the following method is an example.

[1] After producing a polymer that comprises one or more kinds of the above styrene and styrene derivatives and has functional groups, the polymer (J) having a carboxyl group and/or a phenolic hydroxyl group in a side chain thereof is produced by reacting the above produced polymer with a compound having a carboxyl group or a phenolic hydroxyl group.

Specifically, in the case of introducing a carboxyl group into a side chain of the polymer (J), for example, a copolymer having alcoholic hydroxyl groups as functional groups can be obtained by synthesizing a copolymer of the above styrene or styrene derivative and a vinyl monomer having an alcoholic hydroxyl group, such as 2-hydroxylethyl methacrylate (HEMA). Then, a carboxyl group can be introduced into a side chain by conducting a ring-opening addition of an acid anhydride such as trimellitic anhydride to an alcoholic hydroxyl group of HEMA.

Furthermore, in the case of introducing a phenolic hydroxyl group into a side chain of the polymer (J), a polymer having acid anhydride moieties as functional groups can be obtained by synthesizing a polymer of the above styrene or styrene derivative and a vinyl monomer having an acid anhydride moiety, such as maleic anhydride. Then, a phenolic hydroxyl group can be introduced into a side chain by ring-opening the acid anhydride moiety of maleic anhydride with an amino group of a compound having an amino group and a phenolic hydroxyl group, such as aminophenol.

[2] The polymer (J) having a carboxyl group and/or a phenolic hydroxyl group in a side chain thereof is produced by copolymerizing a monomer having a carboxyl group or a phenolic hydroxyl group with reaction activity with the above styrene or styrene derivatives by a conventional method.

Monomers having a carboxyl group or a phenolic hydroxyl group with reaction activity for use in the above [2] include, for example, methacrylic acid, acrylic acid, maleic acid, vinylphenol, vinylbenzoic acid and the like, and the monomers are not limited thereto. Furthermore, these may be used singly or in combination with two or more.

In the resin composition (c) of the present invention, the content of the heterocyclic structure in the polymer (I) is 0.01 to 5 mol % of the total of the resin composition (c), more preferably 0.02 to 2 mol %. If the content of the heterocyclic structure is less than 0.01 mol %, transparency of the resin composition (c) tends to decrease, while if the content exceeds 5 mol %, water absorption of the resin composition tends to increase.

The content s) of the carboxyl group and/or the phenolic hydroxyl group in the polymer (J) are/is 0.01 to 5 mol % of the total of the resin composition (c), more preferably 0.02 to 2 mol %. If the content(s) of the carboxyl group and/or the phenolic hydroxyl group in the polymer (J) are/is less than 0.0 mol %, transparency of the resin composition (c) tends to decrease, while if the content exceeds 5 mol %, water absorption of the resin composition (c) tends to increase.

In the present invention, the molar ratio of the heterocyclic structure to the carboxyl group and/or the phenolic hydroxyl group is preferably 0.1 to 10.0. If this ratio is less than 0.1 or exceeds 10.0, transparency of the resin composition (C) tends to decrease.

Methods of the production of the above polymers (I) and (J) are not particularly limited in the present invention, and the polymers can be produced by a conventional method using the above-mentioned monomers.

Similarly to the diphenylsilicone (D) for use in the resin composition (a), viscosity of the diphenylsilicone (D) for use in the resin composition (c) of the present invention is not particularly limited, and any diphenylsilicone (D) having any viscosity may be used. The addition amount of the diphenylsilicone (D) is preferably in the range of 0.01 to 1.0% by weight, more preferably 0.05 to 0.8% by weight of the total of the resin composition (c). If the addition amount is less than 0.01% by weight, the effect on mold release characteristics from a die in injection molding tends to decrease, while if the addition amount exceeds 1.0% by weight, heat resistance tends to decrease.

Phenolic antioxidants for use in the resin composition (C) of the present invention include phenolic antioxidants (E) for use in the resin composition (a). The addition amount of a phenolic antioxidant is not particularly limited, and is preferably in the range of 0.1 to 3.01 by weight, more preferably 0.5 to 2.0% by weight of the total of the resin composition (c). If the addition amount of a phenolic antioxidant (E) is less than 0.1% by weight, the effect to suppress changes in hue is a little, while if the addition amount exceeds 3.0% by weight, transparency and heat resistance of the resin tend to decrease.

Methods of mixing the polymers (I) and (J) obtained by the above methods, a diphenylsilicone (D), and a phenolic antioxidant (E) are not particularly limited, and the same methods as in the above resin composition (a) may be used.

In the resin composition (c) of the present invention, the content of the polymer (I) is preferably 30 to 90% by weight of the total of the resin composition (c), more preferably 50 to 90% by weight, still more preferably 60 to 85% by weight. If the content of the polymer (I) is less than 30% by weight or more than 901 by weight of the total of the resin composition (c) the absolute value of birefringence tends to increase.

The resin composition (c) of the present invention obtained as mentioned above preferably has a saturated water absorption of 0.4% or less, and preferably has a birefringence in stretching the resin composition by 200% in the range of $-2 \times 10^{-6}$ to $2 \times 10^{-6}$. More preferable saturated water absorption is 0.2% or less, and more preferable birefringence in stretching the resin composition by 200% is in the range of $-1 \times 10^{-6}$ to $1 \times 10^{-6}$.

Saturated water absorptions exceeding 0.4% lead to an increased change in refraction index in absorbing water, thus it is not preferable. Moreover, if the birefringence in stretching the resin composition by 200% is out of the range of $-2 \times 10^{-6}$ to $2 \times 10^{-6}$, it is not preferable because linearly polarized light sometimes greatly changes to elliptically polarized light.

To make the saturated water absorption within the above range, it is satisfactory that each of the content(s) of the carboxyl group and/or the phenolic hydroxyl group in the polymer (I) and the content(s) of the heterocyclic structure and/or the alkylamino group in the polymer (J) satisfies the range of 0.005 to 5 mol %.

To make the birefringence in stretching the resin composition by 200% within the above range, it is satisfactory to make the content of the polymer (I) within the range of 30 to 90% by weight of the total of the resin composition (c).

<4> The Molding Material of the Present Invention

The above resin composition (a), resin composition (b) and resin composition (c) according to the present invention can be processed to obtain a molding material, a sheet or a film. In the present invention, optional components may be added when required in making these resin compositions into molding materials.

The resin compositions of the present invention may be applied to semiconductor-related materials that can satisfy the characteristics such as low permittivity, low hygroscopicity and high heat resistance, or to optical parts, as well as paints, photosensitive materials, adhesives, sewage disposal agents, heavy metal collectors, ion-exchange resins, antistatic agents, antioxidants, anti-fog agents, anti-corrosive agents, reverse printing agents, anti-microbial agents, insecticides, medical materials, coagulants, surfactants, lubricants, binders for solid fuel, conductivity imparting agents, and the like.

Optical parts using a molding material of the present invention include pickup lenses for CD, pickup lenses for DVD, lenses for facsimile, lenses for LBP, polygon mirrors, prisms, and the like.

BEST MODE FOR CARRYING OUT THE INVENTION

The present invention is described in further detail with reference to some examples. However, the present invention should not be construed as being limited to these examples.

Evaluation methods used in the examples are as follows.
(1) Weight-Average Molecular Weight The weight-average molecular weight of a polymer synthesized was determined by GPC measurement with a tetrahydrofuran solution.
(2) Fluidity (MI)

The fluidity of a resin composition was determined by measuring a melt flow rate at 220° C. with a load of 5 kgf.
(3) Saturated Water Absorption The saturated water absorption of a sample was determined by measuring the water absorption when the water absorption reaches saturation with a sample soaked in hot water at 70° C. Water absorption in Table 1 shows the saturated water absorption.
(4) Heat Resistance (Tg)

The heat resistance was evaluated by measuring the glass transition point by DSC (differential scanning calorimetry). The measurement of DSC was carried out under a condition of a rate of temperature rise of 10° C./min.
(5) Relative Permittivity The relative permittivity was measured by using precision LCR meter 4284A Type produced by Hewlett-Packard Company under conditions of 20 kV, 1 kHz and 25° C.
(6) Bending Strength The bending strength of a sample fragment was measured by using AGS-1000G produced by Shimadzu Corporation. The test was carried out at room temperature under conditions of a test speed of 0.5 mm/min., a span of 20 mm and the width of the sample fragment of 10 mm.
(7) Transparency The transparency of a formed sample was measured by using V-570 produced by JASCO Corporation at 25° C. The transparency measured at measurement wavelengths in the range of 400 to 800 nm was assumed to be the total light ray transparency.

(8) Birefringence

The birefringence of an obtained molding material stretched by 150% at a temperature 5° C. lower than the glass transition temperature of the material was measured. The measurement was carried out by using Ellipsometer AEP-100 Type produced by Shimadzu Corporation at 25° C. The wavelength of the laser beam was 632.8 nm.
(9) Change in Hue After a resin was allowed to abide in an injection molding machine at 250° C. for 30 minutes, injection molding was carried out, and then the change in hue of the molding product thus obtained was measured with a spectrocolormeter (produced by Sakata Ink Corporation, Macbeth color-eye 7000A).
(10) Mold Release Characteristics With respect to the mold release characteristics in injection molding, injection molding of a resin was actually carried out, and the surface condition of the resin mold-released from a die and whether the resin was broken or not were visually confirmed.

EXAMPLE 1

Placed in a 100-mL flask were 10.0 g of indene and 30.0 g of toluene, and 0.05 g of $FeCl_3$ was added thereto at 25° C., thereby being allowed to react for 12 hours. Thereafter, 0.05 g of methanol was added to this reaction mixture liquid, and then the liquid was stirred to obtain a homogeneous solution. The homogeneous solution thus obtained was gradually added to 100 g of methanol to obtain 9.7 g of a white precipitate. This white precipitate was dried under reduced pressure to obtain a polymer (A). The weight-average molecular weight of this polymer was 2200.

Placed in a 100-mL flask were 20.0 g of styrene and 0.1 g of benzoyl peroxide, and the mixture was stirred to dissolve. Then, 60 g of distilled water and 0.01 g of calcium phosphate were added thereto, and the mixture was allowed to react at 70° C. for 12 hours with being stirred. A granular polymer thus obtained was isolated and washed with hydrochloric acid. Subsequently, the polymer was dried at 50° C. for about 2 hours to obtain a polymer (B). The weight-average molecular weight of the polymer obtained was 200000.

Dissolved in 20 g of toluene were 6.0 g of the polymer (A) and 4.0 g of the polymer (B), and the mixture was added to about 300 g of methanol to precipitate a solid. This solid was dried at 40° C. for 6 hours to obtain a desired white precipitate. This resin composition was hot-pressed to produce a molding material having a thickness of 2 mm. This molding material was used as a sample fragment. The above-mentioned evaluations were carried out using this sample fragment. The evaluation results are shown in Table 1.

EXAMPLE 2

Placed in a 100-mL flask were 8.0 g of indene, 2.0 g of 4-methylstyrene and 30.0 g of methylene chloride, and 0.05 g of $FeCl_3$ was added thereto at −40° C., thereby being allowed to react for 12 hours. Thereafter 0.05 g of methanol was added to this reaction mixture liquid, and then the liquid was stirred to obtain a homogeneous solution. The homogeneous solution thus obtained was gradually added to 100 g of methanol to obtain 9.8 g of a white precipitate. This white precipitate was dried under reduced pressure to obtain a polymer (A). The weight-average molecular weight of this polymer was 15000.

Placed in a 100-mL flask were 20.0 g of styrene and 0.1 g of benzoyl peroxide, and the mixture was stirred to dissolve. Then, 60 g of distilled water and 0.01 g of calcium phosphate were added thereto, and the mixture was allowed to react at 70° C. for 12 hours with being stirred. After reaction was allowed for a predetermined time, a granular polymer was isolated and washed with hydrochloric acid. Subsequently, the polymer was dried at 50° C. for about 2 hours to obtain a polymer (B). The weight-average molecular weight of the polymer obtained was 200000.

Placed in a 100-mL flask were 14.0 g of styrene, 5.0 g of 4-methylstyrene, 1.0 g of butyl acrylate and 0.1 g of benzoyl peroxide, and the mixture was stirred to dissolve. Then, 60 g of distilled water and 0.01 g of calcium phosphate were added thereto, and the mixture was allowed to react at 70° C. for 12 hours with being stirred. The reaction was allowed for a predetermined time. A granular polymer thus obtained was isolated and washed with hydrochloric acid. Subsequently, the polymer was dried at 50° C. for about 2 hours to obtain a polymer (C). The weight-average molecular weight of the polymer obtained was 240000.

Dissolved in 20 g of toluene were 6.0 g of the polymer (A), 1.5 g of the polymer (3) and 2.5 g of the polymer (C), and the mixture was added to about 300 g of methanol to precipitate a solid. This solid was dried at 40° C. for 6 hours to obtain a desired white precipitate. This resin composition was hot-pressed to produce a molding material having a thickness of 2 mm. This molding material was used as a sample fragment. The evaluation results obtained by evaluating this sample fragment in the same manner as in Example 1 are shown in Table 1.

EXAMPLE 3

Placed in a 100-mL flask were 10.0 g of indene and 30.0 g of toluene, and 0.05 g of $FeCl_3$ was added thereto at 25° C., thereby being allowed to react for 12 hours. Thereafter 0.05 g of methanol was added to this reaction mixture liquid, and then the liquid was stirred to obtain a homogeneous solution. The homogeneous solution thus obtained was gradually added to 100 g of methanol to obtain 9.7 g of a white precipitates. This white precipitate was dried under reduced pressure to obtain a polymer (A). The weight-average molecular weight of this polymer was 2200.

Placed in a 100-mL flask were 20.0 g of styrene and 0.1 g of benzoyl peroxide, and the mixture was stirred to dissolve. Then, 60 g of distilled water and 0.01 g of calcium phosphate were added thereto, and the mixture was allowed to react at 70° C. for 12 hours with being stirred. A granular polymer thus obtained was isolated and washed with hydrochloric acid. Subsequently, the polymer was dried at 50° C. for about 2 hours to obtain a polymer (B). The weight-average molecular weight of the polymer obtained was 200000.

Dissolved in 20 g of toluene were 6.0 g of the polymer (A) and 4.0 g of the polymer (B), 0.01 g of diphenylsilicone (produced by Shin-Etsu Chemical Co., Ltd.) having a viscosity of 500 CS and 0.05 g of n-octadecyl-3-(4-hydroxy-3,5-t-dibutylphenyl)propionate, and the mixture was added to about 300 g of methanol to precipitate a solid. This solid was dried at 40° C. for 6 hours to obtain a desired resin composition. This resin composition was hot-pressed to produce a molding material having a thickness of 2 mm. This molding material was used as a sample fragment. The above-mentioned evaluations were carried out using this sample fragment. The evaluation results are shown in Table 1.

EXAMPLE 4

Placed in a 100-mL flask were 8.0 g of indene, 2.0 g of 4-methylstyrene and 30.0 g of methylene chloride, and 0.05 g of $FeCl_3$ was added thereto at −40° C., thereby being allowed to react for 12 hours. Thereafter, 0.05 g of methanol was added to this reaction mixture liquid, and then the liquid was stirred to obtain a homogeneous solution. The homogeneous solution thus obtained was gradually added to 100 g of methanol to obtain 9.8 g of a white precipitate. This white precipitate was dried under reduced pressure to obtain a polymer (A). The weight-average molecular weight of this polymer was 15000.

Placed in a 100-mL flask were 20.0 g of styrene and 0.1 g of benzoyl peroxide, and the mixture was stirred to dissolve. Then, 60 g of distilled water and 0.01 g of calcium phosphate were added thereto, and the mixture was allowed to react at 70° C. for 12 hours with being stirred. A granular polymer thus obtained was isolated and washed with hydrochloric acid. Subsequently, the polymer was dried at 50° C. for about 2 hours to obtain a polymer (B). The weight-average molecular weight of the polymer obtained was 200000.

Placed in a 100-ml flask were 14.0 g of styrene, 5.0 g of 4-methylstyrene, 1.0 g of butyl acrylate and 0.1 g of benzoyl peroxide, and the mixture was stirred to dissolve. Then, 60 g of distilled water and 0.01 g of calcium phosphate were added thereto, and the mixture was allowed to react at 70° C. for 12 hours with stirring. A granular polymer thus obtained was isolated and washed with hydrochloric acid. Subsequently, the polymer was dried at 50° C. for about 2 hours to obtain a polymer (B). The weight-average molecular weight of the polymer obtained was 240000.

Dissolved in 20 g of toluene were 6.0 g of the polymer (A), 1.5 g of the polymer (B), 2.5 g of the polymer (C), 0.01 g of diphenylsilicone having a viscosity of 500 CS and 0.05 g of n-octadecyl-3-(4-hydroxy-3,5-t-dibutylphenyl) propionate, and the mixture was added to about 300 g of methanol to precipitate a solid. This solid was dried at 40° C. for 6 hours to obtain a desired resin composition. This resin composition was hot-pressed to produce a molding material having a thickness of 2 mm. This molding material was used as a sample fragment. The above-mentioned evaluations were carried out using this sample fragment. The evaluation results are shown in Table 1.

TABLE 1

| Item | unit | Example 1 | | Example 2 | | | Example 3 | | Example 4 | | |
| --- | --- | --- | --- | --- | --- | --- | --- | --- | --- | --- | --- |
| | | Polymer A | Polymer B | Polymer A | Polymer B | Polymer C | Polymer A | Polymer B | Polymer A | Polymer B | Polymer C |
| Molecular weight (Mw) | g/mol | 2200 | 200000 | 15000 | 200000 | 240000 | 2200 | 200000 | 15000 | 200000 | 240000 |
| Mixing ratio | % by weight | 60 | 40 | 60 | 15 | 25 | 60 | 40 | 60 | 15 | 25 |

TABLE 1-continued

| Item | unit | Example 1 Polymer A | Example 1 Polymer B | Example 2 Polymer A | Example 2 Polymer B | Example 2 Polymer C | Example 3 Polymer A | Example 3 Polymer B | Example 4 Polymer A | Example 4 Polymer B | Example 4 Polymer C |
|---|---|---|---|---|---|---|---|---|---|---|---|
| Antioxidant E | % by weight | 0 | | 0 | | | 0.5 | | 0.5 | | |
| Silicone amount D | % by weight | 0 | | 0 | | | 0.1 | | 0.1 | | |
| Fluidity (MI) | g/10 minutes | 21 | | 12 | | | 21 | | 12 | | |
| Water absorption | % | 0.09 | | 0.08 | | | 0.09 | | 0.08 | | |
| Heat resistance (Tg) | °C. | 135 | | 142 | | | 135 | | 142 | | |
| Relative permittivity | — | 2.3 | | 2.2 | | | 2.3 | | 2.2 | | |
| Bending strength | MPa | 80 | | 85 | | | 80 | | 85 | | |
| Transparency | % | 85 | | 85 | | | 85 | | 85 | | |
| Birefringence | — | $1 \times 10^{-4}$ | | $1 \times 10^{-5}$ | | | $1 \times 10^{-6}$ | | $1 \times 10^{-6}$ | | |
| Change in hue | — | 0.28 | | 0.29 | | | 0.12 | | 0.15 | | |

EXAMPLE 10

Placed in a 100-mL flask were 10.0 g of indene and 30.0 g of toluene, and 0.05 g of FeCl₃ was added thereto at 25° C., thereby being allowed to react for 12 hours. Thereafter, 0.05 g of methanol was added to this reaction mixture liquid, and then the liquid was stirred to obtain a homogeneous solution. The homogeneous solution thus obtained was gradually added to 100 g of methanol to obtain 9.7 g of a white precipitate. This white precipitate was dried under reduced pressure to obtain a polymer (A). The weight-average molecular weight of this polymer was 2200.

Next, placed in a 100-mL flask were 20.0 g of styrene and 0.1 g of benzoyl peroxide, and the mixture was stirred to dissolve. Then, 60 g of distilled water and 0.01 g of calcium phosphate were added thereto, and the mixture was allowed to react at 70° C. for 12 hours with being stirred. A granular polymer thus obtained was isolated and washed with hydrochloric acid. Subsequently, the polymer was dried at 50° C. for about 2 hours to obtain a polymer (B). The weight-average molecular weight of the polymer obtained was 200000.

Dissolved in 20 g of toluene were 4.0 g of the polymer (A) and 6.0 g of the polymer (B), and the mixture was added to about 300 g of methanol to precipitate a solid. This solid was dried at 40° C. for 6 hours to obtain a desired white precipitate. This resin composition was hot-pressed to produce a molding material having a thickness of 2 mm. This molding material was used as a sample fragment. The above-mentioned evaluations were carried out using this sample fragment. The evaluation results are shown in Table 2.

COMPARATIVE EXAMPLE 1

Placed in a 100-mL flask were 10.0 g of indene and 30.0 g of nitrobenzene, and 0.05 g of FeCl₃ was added thereto at 0° C., thereby being allowed to react for 12 hours. Thereafter, 0.05 g of methanol was added to this reaction mixture liquid, and then the liquid was stirred to obtain a homogeneous solution. The homogeneous solution thus obtained was gradually added to 100 g of methanol to obtain 9.7 g of a white precipitate. This white precipitate was dried under reduced pressure to obtain a polymer (A). The weight-average molecular weight of this polymer was 7500.

Next, placed in a 100-mL flask were 20.0 g of styrene and 0.1 g of benzoyl peroxide, and the mixture was stirred to dissolve. Then, 60 g of distilled water and 0.01 g of calcium phosphate were added thereto, and the mixture was allowed to react at 70° C. for 12 hours with being stirred. A granular polymer thus obtained was isolated and washed with hydrochloric acid. Subsequently, the polymer was dried at 50° C. for about 2 hours to obtain a polymer (B). The weight-average molecular weight of the polymer obtained was 200000.

Dissolved in 20 g of toluene were 9.5 g of the polymer (A) and 0.5 g of the polymer (B), and the mixture was added to about 300 g of methanol to precipitate a solid. This solid was dried at 40° C. for 6 hours to obtain a white precipitate of a desired resin composition. This resin composition was hot-pressed to produce a molding material having a thickness of 2 mm. This molding material was used as a sample fragment. The above-mentioned evaluations were carried out using this sample fragment. The evaluation results are shown in Table 2.

TABLE 2

| | | Example 10 | | Comparative Example 1 | |
|---|---|---|---|---|---|
| item | unit | Polymer A | Polymer B | Polymer A | Polymer B |
| Molecular weight (Mw) | g/mol | 2200 | 200000 | 7500 | 200000 |
| Mixing ratio | % by weight | 40 | 60 | 95 | 5 |
| Antioxidant E | % by weight | 0 | | 0 | |

TABLE 2-continued

|  |  | Example 10 | | Comparative Example 1 | |
|---|---|---|---|---|---|
| item | unit | Polymer A | Polymer B | Polymer A | Polymer B |
| Silicone amount D | % by weight |  | 0 |  | 0 |
| Fluidity (MI) | g/10 minutes |  | 13 |  | 12 |
| Water absorption | % |  | 0.10 |  | 0.08 |
| Heat resistance (Tg) | ° C. |  | 121 |  | 142 |
| Relative permittivity | — |  | 2.3 |  | 2.3 |
| Bending strength | Mpa |  | 80 |  | 48 |
| Transparency | % |  | 85 |  | 85 |
| Birefringence | — |  | $5 \times 10^{-5}$ |  | Could not be measured |
| Change in hue | — |  | 0.28 |  | 0.29 |

EXAMPLE 5

Placed in a 100-mL flask were 10.0 g of indene and 30.0 g of nitrobenzene, and 0.05 g of $FeCl_3$ was added thereto at 0° C., thereby being allowed to react for 12 hours. Thereafter, 0.05 g of methanol was added to this reaction mixture liquid, and then the liquid was stirred to obtain a homogeneous solution. The homogeneous solution thus obtained was gradually added to 100 g of methanol to obtain 9.7 g of a white precipitate. This white precipitate was dried under reduced pressure to obtain a polymer (F). The weight-average molecular weight of this polymer was 7500.

Placed in a 100-mL flask were 20.0 g of styrene and 0.1 g of benzoyl peroxide, and the mixture was stirred to dissolve. Then, 60 g of distilled water and 0.01 g of calcium phosphate were added thereto, and the mixture was allowed to react at 70° C. for 12 hours with being stirred. A granular polymer thus obtained was isolated and washed with hydrochloric acid. Subsequently, the polymer was dried at 50° C. for about 2 hours to obtain a polymer (G). The weight-average molecular weight of the polymer obtained was 200000.

In advance, 18.0 g of styrene, 2.0 g of p-chloromethylstyrene and 0.1 g of benzoyl peroxide were placed in a 100-mL flask, the mixture was stirred to dissolve. Then, 60 g of distilled water and 0.1 g of calcium phosphate were added thereto, and the mixture was allowed to react at 70° C. for 12 hours with stirring. Thereafter a granular polymer was isolated and washed with hydrochloric acid. Subsequently, the polymer was dried at 50° C. for about 2 hours. Dissolved in 30 g of toluene was 6.0 g of the granular polymer thus obtained, and 4.0 g of indene was further added thereto, and the mixture was stirred until the mixture became homogeneous. After that, 0.003 g of 2,6-bis(t-butyl) pyridine was added at 25° C. and dissolved. Then, 0.03 g of tin chloride was added, and the mixture was allowed to stand for 24 hours to obtain a graft polymer (H). After 0.05 g of methanol was added to the reaction mixture liquid thus obtained, this reaction mixture liquid was poured in methanol in an amount about 10 times that of the reaction mixture liquid of methanol, and a polymer thus formed was isolated. This polymer was dried at 40° C. for 6 hours to obtain 9.8 g of a polymer (H). The weight-average molecular weight of this polymer was 210000.

Dissolved in 20 g of toluene were 5.5 g of the polymer (F), 3.5 g of the polymer (G), and 1.0 g of the polymer (H), and the mixture was added to about 300 g of methanol to precipitate a solid. This solid was dried at 40° C. for 6 hours to obtain a white precipitate of a desired resin composition. This resin composition was hot-pressed to produce a molding material having a thickness of 2 mm. This molding material was used as a sample fragment. The above-mentioned evaluations were carried out using this sample fragment. The evaluation results are shown in Table 3.

EXAMPLE 6

Placed in a 100-mL flask were 10.0 g of indene and 30.0 g of nitrobenzene, and 0.05 g of $FeCl_3$ was added thereto at 0° C., thereby being allowed to react for 12 hours. Thereafter, 0.05 g of methanol was added to this reaction mixture liquid, and then the liquid was stirred to obtain a homogeneous solution. The homogeneous solution thus obtained was gradually added to 100 g of methanol to obtain 9.7 g of a white precipitate. This white precipitate was dried under reduced pressure to obtain a polymer (F). The weight-average molecular weight of this polymer was 7500.

Placed in a 100-mL flask were 20.0 g of styrene and 0.1 g of benzoyl peroxide, and the mixture was stirred to dissolve. Then, 60 g of distilled water and 0.01 g of calcium phosphate were added thereto, and the mixture was allowed to react at 70° C. for 12 hours with being stirred. A granular polymer thus obtained was isolated and washed with hydrochloric acid. Subsequently, the polymer was dried at 50° C. for about 2 hours to obtain a polymer (G). The weight-average molecular weight of the polymer obtained was 200000.

In advance, 18.0 g of styrene, 2.0 g of p-chloromethylstyrene and 0.1 g of benzoyl peroxide were placed in a 100-mL flask, the mixture was stirred to dissolve. Then, 60 g of distilled water and 0.1 g of calcium phosphate were added thereto, and the mixture was allowed to react at 70° C. for 12 hours with being stirred. After the reaction was allowed for a predetermined time, the granular polymer was isolated and washed with hydrochloric acid. Subsequently, the polymer was dried at 50° C. for about 2 hours. Dissolved in 30 g of toluene was 6.0 g of the granular polymer thus obtained, and 4.0 g of indene was further added thereto, and the mixture was stirred until the mixture became homogeneous. After that, 0.003 g of 2,6-bis(t-butyl)pyridine was added at 25° C. and dissolved. Then, 0.03 g of tin chloride was added, and the mixture was allowed to stand for 24 hours to obtain a graft polymer. After 0.05 g of methanol was added to the reaction mixture liquid, this reaction mixture liquid was poured in methanol in about 10 times the amount of the reaction mixture liquid of methanol, and a polymer thus formed was isolated. This polymer was dried at 40° C. for 6 hours to obtain 9.8 g of a polymer (H). The weight-average molecular weight of this polymer was 210000.

Dissolved in 20 g of toluene were 5.5 g of the polymer (F), 3.5 g of the polymer (G), 1.0 g of the polymer (H), 0.01 g of diphenylsilicone (produced by Shin-Etsu Chemical Co., Ltd.) having a viscosity of 500 CS and 0.05 g of n-octadecyl-3-(4-hydroxy-3,5-t-dibutylphenyl)propionate, and the mixture was added to about 300 g of methanol to precipitate a solid. This solid was dried at 40° C. for 6 hours to obtain a white precipitate of a desired resin composition. This resin composition was hot-pressed to produce a molding material having a thickness of 2 mm. This molding material was used as a sample fragment. The above-mentioned evaluations were carried out using this sample fragment. The evaluation results are shown in Table 3.

EXAMPLE 7

Placed in a 100-mL flask were 10.0 g of indene and 30.0 g of toluene, and 0.01 g of $AlCl_3$ was added thereto at 25° C., thereby being allowed to react for 6 hours. Thereafter 0.01 g of methanol was added to this reaction mixture liquid, and then the liquid was stirred to obtain a homogeneous solution. The homogeneous solution thus obtained was gradually added to 100 g of methanol to obtain 9.8 g of a white precipitate. This white precipitate was dried under reduced pressure to obtain a polymer (F). The weight-average molecular weight of this polymer was 10000.

Placed in a 100-mL flask were 20.0 g of styrene and 0.1 g of benzoyl peroxide, and the mixture was stirred to dissolve. Then, 60 g of distilled water and 0.01 g of calcium phosphate were added to the monomer mixture, and the mixture was allowed to react at 70° C. for 12 hours with being stirred. A granular polymer thus obtained was isolated to obtain a polymer (G). The weight-average molecular weight of the polymer obtained was 200000.

In advance, 18.0 g of styrene, 2.0 g of p-chloromethylstyrene and 0.1 g of benzoyl peroxide were placed in a 100-mL flask, the mixture was stirred to dissolve. Then, 60 g of distilled water and 0.01 g of calcium phosphate were added to the monomer mixture, and the mixture was allowed to react at 70° C. for 12 hours with bring stirred. The granular polymer thus obtained was isolated and washed with hydrochloric acid. Subsequently, the polymer was dried at 50° C. for about 2 hours. Dissolved in 30 g of toluene was 6.0 g of the granular polymer thus obtained, and 4.0 g of indene was further added thereto, and the mixture was stirred until the mixture became homogeneous. After that, 0.003 g of 2,6-bis(t-butyl)pyridine was added at 25° C. and dissolved. Then, 0.03 g of tin chloride was added, and the mixture was allowed to stand for 24 hours to obtain a graft polymer. After 0.05 g of methanol was added to the reaction mixture liquid thus obtained, this reaction mixture liquid was poured in methanol in about 10 times the amount of the reaction mixture liquid of methanol, and a polymer thus formed was isolated. This polymer was dried at 40° C. for 6 hours to obtain 9.8 g of a polymer (H). The weight-average molecular weight of this polymer was 200000.

Dissolved in 20 g of toluene were 6.0 g of the polymer (F), 3.5 g of the polymer (G), 0.5 g of the polymer (H), 0.01 g of diphenylsilicone (produced by Shin-Etsu Chemical Co., Ltd.) having a viscosity of 500 CS and 0.05 g of n-octadecyl-3-(4-hydroxy-3,5-t-dibutylphenyl)propionate, and the mixture was added to about 300 g of methanol to precipitate a solid. This solid was dried at 40° C. for 6 hours to obtain a desired resin composition. This resin composition was hot-pressed to produce a molding material having a thickness of 2 mm. This molding material was used as a sample fragment. The above-mentioned evaluations were carried out using this sample fragment. The evaluation results are shown in Table 3.

TABLE 3

| item | unit | Example 5 Polymer F | Example 5 Polymer G | Example 5 Polymer H | Example 6 Polymer F | Example 6 Polymer G | Example 6 Polymer H | Example 7 Polymer F | Example 7 Polymer G | Example 7 Polymer H |
|---|---|---|---|---|---|---|---|---|---|---|
| Molecular weight (Mw) | g/mol | 7500 | 200000 | 210000 | 7500 | 200000 | 210000 | 10000 | 200000 | 200000 |
| Mixing ratio | % by weight | 55 | 35 | 10 | 55 | 35 | 10 | 60 | 35 | 5 |
| Antioxidant E | % by weight | | 0 | | | 0.5 | | | 0.5 | |
| Silicone amount D | % by weight | | 0 | | | 0.1 | | | 0.1 | |
| Fluidity (MI) | g/10 minutes | | 18 | | | 18 | | | 22 | |
| Water absorption | % | | 0.09 | | | 0.09 | | | 0.08 | |
| Heat resistance (Tg) | ° C. | | 147 | | | 147 | | | 152 | |
| Relative permittivity | — | | 2.3 | | | 2.3 | | | 2.2 | |
| Bending strength | MPa | | 80 | | | 80 | | | 80 | |
| Transparency | % | | 85 | | | 85 | | | 85 | |
| Birefringence | — | | $1 \times 10^{-6}$ | | | $1 \times 10^{-6}$ | | | $1 \times 10^{-6}$ | |
| Change in hue | — | | 0.35 | | | 0.12 | | | 0.11 | |

COMPARATIVE EXAMPLE 3

Placed in a 100-mL flask were 10.0 g of indene and 30.0 g of nitrobenzene, and 0.05 g of $FeCl_3$ was added thereto at 0° C., thereby being allowed to react for 12 hours. Thereafter, 0.05 g of methanol was added to this reaction mixture liquid, and then the liquid was stirred to obtain a homogeneous solution. The homogeneous solution thee obtained was gradually added to 100 g of methanol to obtain 9.7 g of a white precipitate. This white precipitate was dried under reduced pressure to obtain a polymer (F). The weight-average molecular weight of this polymer was 7500.

Placed in a 100-mL flask were 20.0 g of styrene and 0.1 g of benzoyl peroxide, and the mixture was stirred to dissolve. Then, 60 g of distilled water and 0.01 g of calcium phosphate were added to the monomer mixture, and the mixture was allowed to react at 70° C. for 12 hours with being stirred. A granular polymer thus obtained was isolated and washed with hydrochloric acid. Subsequently, the polymer was dried at 50° C. for about 2 hours to obtain a polymer (G). The weight-average molecular weight of the polymer obtained was 200000.

Dissolved in 20 g of toluene were 6.0 g of the polymer (F) and 4.0 g of the polymer (G), and the mixture was added to about 300 g of methanol to precipitate a solid. This solid was dried at 40° C. for 6 hours to obtain a white precipitate of a resin composition. This resin composition was hot-pressed to produce a molding material having a thickness of 2 mm. This molding material was used as a sample fragment. The above-mentioned evaluations were carried out using this sample fragment. The evaluation results are shown in Table 4.

TABLE 4

| | | Reference Example 1 | |
|---|---|---|---|
| item | unit | Polymer F | Polymer G |
| Molecular weight (Mw) | g/mol | 7500 | 200000 |
| Mixing ratio | % by weight | 60 | 40 |
| Antioxidant E | % by weight | 0 | |
| Silicone amount D | % by weight | 0 | |
| Fluidity (MI) | g/10 minutes | 17 | |
| Water absorption | % | 0.10 | |
| Heat resistance (Tg) | ° C. | 142 | |
| Relative permittivity | — | 2.3 | |
| Bending strength | MPa | 75 | |
| Transparency | % | 55 | |
| Birefringence | — | Could not be measured | |
| Change in hue | — | 0.35 | |

EXAMPLE 8

Placed in a 100-mL flask were 9.95 g of indene, 0.05 g of vinylpyridine and 30.0 g of methylene chloride, and 0.01 g of $FeCl_3$ was added thereto at −40° C., thereby being allowed to react for 24 hours. Thereafter, 0.05 g of methanol was added at room temperature to this reaction mixture liquid, and then the liquid was stirred to obtain a homogeneous solution. The homogeneous solution thus obtained was gradually added to 100 g of methanol to obtain 9.8 g of a white precipitate. This white precipitate was dried under reduced pressure to obtain a polymer (I). The weight-average molecular weight of this polymer was 97000.

Placed in a 100-mL flask were 19.9 g of styrene, 0.1 g of methacrylic acid and 0.1 g of benzoyl peroxide, and the mixture was stirred to dissolve. Then, the mixture was sealed and allowed to react at 70° C. for 12 hours with reflux. The polymer thus obtained was granulated and then washed with methanol. Subsequently, the polymer was dried at 50° C. for about 8 hours to obtain a polymer (J). The weight-average molecular weight of the polymer obtained was 250000.

Dissolved in 20 g of toluene were 6.0 g of the polymer (I), 4.0 g of the polymer (J), 0.0 g of diphenylsilicone having a viscosity of 500 CS and 0.05 g of n-octadecyl-3-(4-hydroxy 3,5-t-dibutylphenyl)propionate, and the mixture was added to about 300 g of methanol to precipitate a solid. This solid was dried at 40° C. for 6 hours to obtain a desired resin composition. This resin composition was hot-pressed to produce a molding material having a thickness of 2 mm. This molding material was used as a sample fragment. The above-mentioned evaluations were carried out using this sample fragment. The evaluation results are shown in Table 5.

EXAMPLE 9

Placed in a 100-mL flask were 9.95 g of indene, 0.05 g of vinylpyridine and 30.0 g of toluene, and 0.01 g of $AlCl_3$ was added thereto at −4° C., thereby being allowed to react for 24 hours. Thereafter, 0.05 g of methanol was added at room temperature to this reaction mixture liquid, and then the liquid was stirred to obtain a homogeneous solution. The homogeneous solution thus obtained was gradually added to 100 g of methanol to obtain 9.7 g of a white precipitate. This white precipitate was dried under reduced pressure to obtain a polymer (I). The weight-average molecular weight of this polymer was 50000.

Placed in a 100-mL flask were 19.8 g of styrene, 0.2 g of methacrylic acid and 0.1 g of benzoyl peroxide, and the mixture was stirred to dissolve. Then, the mixture was sealed and allowed to react at 70° C. for 12 hours with reflux. A polymer thus obtained was granulated and then washed with methanol. Subsequently, the polymer was dried at 50° C. for about 8 hours to obtain a polymer (J). The weight-average molecular weight of the polymer obtained was 250000.

Dissolved in 20 g of toluene were 6.0 g of the polymer (I), 4.0 g of the polymer (J), 0.01 g of diphenylsilicone (produced by Shin-Etsu Chemical Co., Ltd.) having a viscosity of 500 CS and 0.05 g of n-octadecyl-3-(4-hydroxy-3,5-t-dibutylphenyl)propionate, and the mixture was added to about 300 g of methanol to precipitate a solid. This solid was dried at 40° C. for 6 hours to obtain a desired resin composition. This resin composition was hot-pressed to produce a molding material having a thickness of 2 mm. This molding material was used as a sample fragment. The above-mentioned evaluations were carried out using this sample fragment. The evaluation results are shown in Table 5.

TABLE 5

| | | Example 8 | | Example 9 | |
|---|---|---|---|---|---|
| item | unit | Polymer I | Polymer J | Polymer I | Polymer J |
| Molecular weight (Mw) | g/mol | 97000 | 250000 | 50000 | 250000 |
| Mixing ratio | % by weight | 60 | 40 | 60 | 40 |
| Heterocycle amount | mol % | 0.55 | 0 | 0.55 | 0 |
| Carboxyl group amount | mol % | 0 | 0.53 | 0 | 1.06 |

TABLE 5-continued

|  |  | Example 8 | | Example 9 | |
| --- | --- | --- | --- | --- | --- |
| item | unit | Polymer I | Polymer J | Polymer I | Polymer J |
| Heterocycle/carboxyl group ratio | mol/mol | 1.04 | | 0.52 | |
| Antioxidant E | % by weight | 0.5 | | 0.5 | |
| Silicone amount D | % by weight | 0.1 | | 0.1 | |
| Fluidity (MI) | g/10 minutes | 15 | | 12 | |
| Water absorption | % | 0.10 | | 0.11 | |
| Heat resistance (Tg) | °C. | 147 | | 142 | |
| Relative permittivity | — | 2.3 | | 2.3 | |
| Bending strength | Mpa | 80 | | 82 | |
| Transparency | % | 85 | | 86 | |
| Birefringence | — | $1 \times 10^{-6}$ | | $1 \times 10^{-6}$ | |
| Change in hue | — | 0.12 | | 0.11 | |

REFERENCE EXAMPLE 2

An experiment was carried out in the same manner as in Example 7 except using only 10.0 g of indene and not using vinylpyridine and methylene chloride in the synthesis of the polymer (I), and using only 20.0 g of styrene and not using methacrylic acid in the synthesis of the polymer (H). The above-mentioned evaluations were conducted using this sample fragment. The evaluation results are shown in Table 6.

REFERENCE EXAMPLE 3

An experiment was carried out in the same manner as in Example 7 except not using 0.01 g of diphenylsilicone having a viscosity of 500 CS (produced by Shin-Etsu Chemical Co., Ltd.) and 0.05 g of n-octadecyl-3-(4-hydroxy-3,5-t-dibutylphenyl)propionate. The above-mentioned evaluations were conducted using this sample fragment. The evaluation results are shown in Table 6.

TABLE 6

|  |  | Reference Example 2 | | Reference Example 3 | |
| --- | --- | --- | --- | --- | --- |
| item | unit | Polymer I | Polymer J | Polymer I | Polymer J |
| Molecular weight (Mw) | g/mol | 15000 | 250000 | 15000 | 250000 |
| Mixing ratio | % by weight | 60 | 40 | 60 | 40 |
| Heterocycle amount | mol % | 0 | 0 | 0.55 | 0 |
| Carboxyl group amount | mol % | 0 | 0 | 0 | 0.53 |
| Heterocycle/carboxyl group ratio | mol/mol | — | | 1.04 | |
| Antioxidant E | % by weight | 0.5 | | 0 | |
| Silicone amount D | % by weight | 0.1 | | 0 | |
| Fluidity (MI) | %/10 minutes | 14 | | 15 | |
| Water absorption | % | 0.09 | | 0.09 | |
| Heat resistance (Tg) | °C. | 142 | | 143 | |
| Relative permittivity | — | 2.2 | | 2.2 | |
| Bending strength | MPa | 80 | | 80 | |
| Transparency | % | 42 | | 85 | |
| Birefringence | — | $1 \times 10^{-6}$ | | $1 \times 10^{-6}$ | |
| Change in hue | — | 0.15 | | 3.7 | |

INDUSTRIAL APPLICABILITY

The present invention can provide resin compositions having low hygroscopicity, low birefringence and low permittivity, being excellent in fluidity, causing little change in color upon heating, and excelling in mold release characteristics in injection molding. Furthermore, the use of a molding material, a sheet or a film obtained by molding these resin compositions can provide an optical part having low hygroscopicity, low birefringence and low permittivity.

What is claimed is:

1. An optical part using a molding material being obtained by molding a resin composition (a) comprising the following polymers (A) and either or both of (B) and (C):

(A) a polymer comprising monomer units which are one or more kinds of indene and indene derivatives represented by the following general formula (I);

(B) a polymer consisting of monomer units which are styrene or styrene derivatives;

(C) a polymer comprising monomer units which are styrene or styrene derivatives, and a monomer unit copolymerizable with styrene or a styrene derivative selected from the group consisting of styrene, nucleus-substituted alkylstyrenes, nucleus-substituted aromatic styrenes, α-substituted alkylstyrenes, β-substituted alkylstyrenes, nucleus-substituted alkoxystyrenes, alkyl vinyl ethers, aromatic vinyl ethers isobutene, diisobutylene, and (meth)acrylic esters having 1 to 8 carbon atoms;

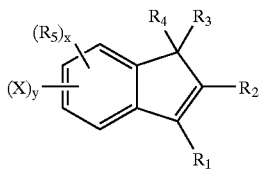

wherein $R_1$, $R_2$, $R_3$, $R_4$, and $R_5$ may be the same or different, and each represents a hydrogen atom; a monovalent hydrocarbon group containing a nitrogen atom, an oxygen atom or a silicon atom; an alkyl group having 1 to 6 carbon atoms; or a monovalent aromatic hydrocarbon group; X represents a hydrogen atom, a halogen atom, an acyl group, an alkoxy group or a nitrile group; x represents an integer of 0 to 3, and y represents an integer of 1 to 4, wherein x+y=4, wherein the saturated water absorption is 0.4% or less, and the birefringence in stretching the resin composition by 200% is in the range of $-2 \times 10^{-6}$ to $2 \times 10^{-6}$.

2. A resin composition (b) comprising the following polymers (F), (G), and (H):

(F) a polymer comprising monomer units which are one or more kinds of indene and indene derivatives represented by the following general formula (I);

(G) a polymer comprising monomer units which are styrene or styrene derivatives; and (H) a graft polymer having a structure wherein the polymer (F) bonds to a side chain of a polymer comprising monomer units which are styrene or styrene derivatives, and a monomer unit copolymerizable with styrene or styrene derivatives selected from the group consisting of styrene, nucleus-substituted alkylstyrenes, nucleus-substituted aromatic styrenes, α-substituted alkylstyrenes, β-substituted alkylstyrenes, nucleus-substituted alkoxystyrenes, alkyl vinyl ethers, aromatic vinyl ethers, isobutene, diisobutylene, and (meth)acrylic esters having 1 to 8 carbon atoms:

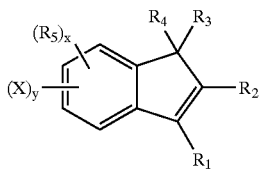

wherein $R_1$, $R_2$, $R_3$, $R_4$, and $R_5$ may be the same or different, and each represents a hydrogen atom; a monovalent hydrocarbon group containing a nitrogen atom, an oxygen atom or a silicon atom; an alkyl group having 1 to 6 carbon atoms; or a monovalent aromatic hydrocarbon group; X represents a hydrogen atom, a halogen atom, an acyl group, an alkoxy group or a nitrile group; x represents an integer of 0 to 3, and y represents an integer of 1 to 4, where x+y=4.

3. The resin composition (b) according to claim 2, wherein a diphenylsilicone (D) and/or phenolic antioxidant (E) are/is added to the resin composition comprising the polymers (F), (G) and (H).

4. The resin composition (b) according to claim 2, wherein the saturated water absorption is 0.4% or less, and the birefringence in stretching the resin composition by 200% is in the range of $-2 \times 10^{-6}$ to $2 \times 10^{-6}$.

5. The resin composition (b) according to claim 2, wherein the weight-average molecular weight of the polymer (F) is 4000 or higher.

6. The resin composition (b) according to claim 2, wherein the weight-average molecular weights of the polymer (G) and the polymer (H) are 50000 or higher.

7. The resin composition (b) according to claim 2, wherein the content of the polymer (F) is 30 to 90% by weight of the total of the resin composition (b).

8. A molding material for use in optical parts, the molding material being obtained by molding a resin composition according to claim 2.

9. A sheet for use in optical parts, the sheet being obtained from a resin composition according to claim 2.

10. A film for use in optical parts, the film being obtained from a resin composition according to claim 2.

11. An optical part using a molding material, a sheet or the film being obtained by molding a resin composition according to claim 2.

12. A resin composition (c) comprising the following polymers (I) and (J), diphenylsilicone (D), and a phenolic antioxidant (E):

(I) a polymer comprising monomer units which are one or more kinds of indene and indene derivatives represented by the following general formula (I), wherein the polymer has a heterocyclic structure selected from the group consisting of pyridine, imidazoline, pyrazine, pyrimidine, quinoline, indolizine, acridine, furan, thiophene, and oxazole, in a side chain thereof; and (J) a polymer comprising styrene or a styrene derivative, and a monomer copolymerizable with styrene or a styrene derivative, wherein the polymer has a carboxyl group and/or a phenolic hydroxyl group in a side chain thereof:

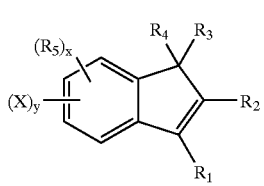

wherein $R_1$, $R_2$, $R_3$, $R_4$, and $R_5$ may be the same or different, and each represents a hydrogen atom; a monovalent hydrocarbon group containing a nitrogen atom, an oxygen atom or a silicon atom; an alkyl group having 1 to 6 carbon atoms; or a monovalent aromatic hydrocarbon group; X represents a hydrogen atom, a halogen atom, an acyl group, an alkoxy group or a nitrile group; x represents an integer of 0 to 3, and Y represents an integer of 1 to 4, where x+y=4.

13. The resin composition (c) according to claim 12, wherein the saturated water absorption is 0.4% or less, and the birefringence in stretching the resin composition by 200% is in the range of $-2 \times 10^{-6}$ to $2 \times 10^{-6}$.

14. The resin composition (c) according to claim 12, wherein the content of the heterocyclic structure in the polymer (I) is 0.01 to 5 mol % of the total of the resin composition (c), and the content of the carboxyl group and/or the phenolic hydroxyl group in the polymer (J) are/is 0.01 to 5 mol % of the total of the resin composition (c).

15. The resin composition (c) according to claim 12, wherein the molar ratio of the heterocyclic structure to the carboxyl group and/or the phenolic hydroxyl group is 0.1 to 10.0.

16. The resin composition (c) according to claim 12, wherein the content of the polymer (I) is 30 to 90% by weight of the total of the resin composition (c).

17. The resin composition (c) according to claim 12, wherein the addition amount of the diphenylsilicone (D) is 0.01 to 1.0% by weight of the total of the resin composition (c), and the addition amount of the phenolic antioxidant (E) is 0.1 to 3.0% by weight of the total of the resin composition (c).

18. A molding material for use in optical parts, the molding material being obtained by molding a resin composition according to claim 12.

19. A sheet for use in optical parts, the sheet being obtained from a resin composition according to claim 12.

20. A film for use in optical parts, the film being obtained from a resin composition according to claim 12.

21. An optical part using a molding material, a sheet or a film being obtained by molding a resin composition according to claim 12.

* * * * *

UNITED STATES PATENT AND TRADEMARK OFFICE
CERTIFICATE OF CORRECTION

PATENT NO. : 6,900,273 B1
DATED : May 31, 2005
INVENTOR(S) : Yamashita et al.

It is certified that error appears in the above-identified patent and that said Letters Patent is hereby corrected as shown below:

<u>Column 30,</u>
Line 65, "aromatic vinyl ethers isobutene," should be changed to -- aromatic vinyl ethers, isobutene, --.
Line 67, "carbon atoms;" should be changed to -- carbon atoms: --.

Signed and Sealed this

Twenty-second Day of November, 2005

JON W. DUDAS
*Director of the United States Patent and Trademark Office*